(12) United States Patent
Nicodem et al.

(10) Patent No.: US 7,079,970 B2
(45) Date of Patent: Jul. 18, 2006

(54) PRINTER TESTER

(75) Inventors: Harry E. Nicodem, McHenry, IL (US); Timothy Knecht, Buffalo Grove, IL (US)

(73) Assignee: Tonerhead, Inc., Richmond, IL (US)

( * ) Notice: Subject to any disclaimer, the term of this patent is extended or adjusted under 35 U.S.C. 154(b) by 0 days.

(21) Appl. No.: 10/933,681

(22) Filed: Sep. 3, 2004

(65) Prior Publication Data

US 2005/0119851 A1    Jun. 2, 2005

Related U.S. Application Data

(60) Provisional application No. 60/500,143, filed on Sep. 4, 2003.

(51) Int. Cl.
*G06F 11/00* (2006.01)
(52) U.S. Cl. ............................ 702/108; 714/44; 714/25
(58) Field of Classification Search ................ None
See application file for complete search history.

(56) References Cited

U.S. PATENT DOCUMENTS

| | | | | | |
|---|---|---|---|---|---|
| 4,489,414 | A | * | 12/1984 | Titherley | 714/723 |
| 4,694,408 | A | * | 9/1987 | Zaleski | 701/33 |
| 4,837,764 | A | * | 6/1989 | Russello | 714/46 |
| 4,953,165 | A | * | 8/1990 | Jackson | 714/44 |
| 4,964,124 | A | * | 10/1990 | Burnett | 714/44 |
| 5,001,655 | A | * | 3/1991 | Higano et al. | 702/108 |
| 5,173,855 | A | * | 12/1992 | Nielsen et al. | 700/284 |
| 5,210,703 | A | * | 5/1993 | Hodgson | 398/33 |
| 5,357,519 | A | * | 10/1994 | Martin et al. | 714/25 |
| 5,432,705 | A | * | 7/1995 | Severt et al. | 702/120 |
| 5,768,495 | A | * | 6/1998 | Campbell et al. | 714/25 |

* cited by examiner

*Primary Examiner*—Carol S. W. Tsai
(74) *Attorney, Agent, or Firm*—Vedder Price Kaufman & Kammholz

(57) ABSTRACT

An apparatus for delivering one or more messages to a computer printer sufficiently self-contained so as to require neither support or nor interface with additional equipment in order to deliver the one or more messages.

16 Claims, 16 Drawing Sheets

TABLE OF CONNECTOR & MICROCONTROLLER FUNCTIONS

| FUNCTION | MICRO-CONTROLLER 40 FUNCTION NAME | MICRO-CONTROLLER 40 PIN # | CONNECTOR 4 FUNCTION NAME | CONNECTOR 4 PIN # |
|---|---|---|---|---|
| Message Data Bit 1 | PB0 | 12 | D0 | 2 |
| Message Data Bit 2 | PB1 | 13 | D1 | 3 |
| Message Data Bit 3 | PB2 | 14 | D2 | 4 |
| Message Data Bit 4 | PB3 | 15 | D3 | 5 |
| Message Data Bit 5 | PB4 | 16 | D4 | 6 |
| Message Data Bit 6 | PB5 | 17 | D5 | 7 |
| Message Data Bit 7 | PB6 | 18 | D6 | 8 |
| Message Data Bit 8 | PB7 | 19 | D7 | 9 |
| Control Signal 1 | PD0 | 2 | BSY | 11 |
| Control Signal 2 | PD1 | 3 | /STR | 1 |
| Pushbutton Signal 1 | PD3 | 7 | N/A | N/A |
| Pushbutton Signal 2 | PD5 | 9 | N/A | N/A |
| "WAKE UP" | RST | 1 | N/A | N/A |
| "READY" | VCC | 20 | /OFON | 13 |

FIG. 4

Blank

FIG. 8

PRINTER TESTER

This application claims the benefit of Provisional Application No. 60/500,143, filed Sep. 4, 2003.

FIELD OF THE INVENTION

This invention relates to handheld devices that deliver stored messages to computer printers for testing or other purposes.

BACKGROUND OF THE INVENTION

The present invention relates to a handheld device that will send stored messages to an attached computer printer. The device, when connected to the computer printer, requires no battery or external power to operate.

Conventionally, devices which connect to computer printers are meant to perform functional tests, i.e., to test the operation of one or more functions of the subject computer printer. In the present invention, the actual message delivered to the computer printer is not limited to computer printer test purposes and, as will be described in following sections, can be used for many other purposes unrelated to computer printer testing. However, since most prior art is directed toward the use of such devices to test computer printers, discussion in this section is focused on delivering messages to computer printers for the purpose of performing functional tests.

Computer printer tests are performed for a variety of reasons. The purposes of such tests include testing of the paper handling mechanism, testing of the inking or toner properties, testing of the character forming ability, testing of the various controls found on the subject printer, testing of internal electronics or testing of final print quality.

For these and other similar test purposes, devices are connected to computer printers so that testing can occur during manufacture of the computer printer, during quality control inspections, as incoming inspection by purchasers of computer printers, during periodic maintenance or while repairing the computer printer as the result of a failure. The following examples are considered to be representative of the prior art and are burdened by the disadvantages set forth herein.

One such testing device, U.S. Pat. No. 5,729,555 to Ichikawa, stores an array of operating parameters for the printer under test, and, under control of a master test program, randomly cycles through various driving functions, measuring the results either by monitoring status messages from the printer or by human review. In this device, each type of printer to be tested requires its own operating parameter array and the operating parameter array must be changed for each type of printer device tested.

Another test device, U.S. Pat. No. 6,400,462 to Hille, is intended for operation by trained maintenance personnel. This device provides a display monitor so that different menus of test activities can be presented to the operator resulting in test messages generated and sent to the printer under test. The results are monitored by the operator so that an appropriate course of operator intervention can be determined.

Yet another device, U.S. Pat. No. 5,619,307 to Machino, et al., attempts to analyze the results of a status query and automatically create a set of test patterns to be delivered to the printer. The ability to analyze results from previously programmed computer algorithms residing in and executed by the test device. In this instance, the test device itself resembles a small computer.

Still another testing device U.S. Pat. No. 5,270,774 to Kikuchi is limited to a specific type of computer printer, an electrophotographic imaging device. This device is itself sufficiently complex so as to resemble the computers to which the printer is normally connected.

As an additional drawback, none of the above devices are easily portable and all require external power or replaceable/rechargeable battery power.

The above examples show that computer printer testers can be complex, expensive to manufacture and demanding of operator training. Therefore, there is a need for an apparatus which is simple in function, inexpensive to manufacture, portable, non-demanding of operator training, can be operated without outside power or battery power and can deliver a message to a computer printer, which message may be used to test the computer printer.

SUMMARY OF THE INVENTION

It is an object of the present invention to provide an apparatus to deliver one or more messages to a computer printer.

It is an additional object of the present invention to provide an apparatus for delivering one or more messages to a computer printer which apparatus connects to the same connector port on the computer printer that is normally used to connect the printer to the computer. The present invention may connect directly to the printer port or it may be connected through an intervening, industry-standard cable.

It is an additional object of the present invention to provide an apparatus for delivering one or more messages to a computer printer which apparatus is compact enough to be held comfortably in one hand.

Further, it is an object of the present invention to provide an apparatus for delivering one or more messages to a computer printer which apparatus is sufficiently self-contained so as to require neither support of nor interface with additional equipment, except for the object computer printer, in order to deliver one or more messages to a computer printer.

It is yet an additional object of the present invention to provide an apparatus for delivering one or more messages to a computer printer which apparatus requires no battery or external power to deliver one or more messages to a computer printer.

It is yet an additional object of the present invention to provide an apparatus for delivering one or more messages to a computer printer which apparatus is simple enough in construction and operation that it can be operated by relatively untrained personnel.

It is yet an additional object of the present invention to provide an apparatus for delivering one or more messages to a computer printer wherein the message(s) to be provided is stored within the apparatus.

It is a further object of the present invention to provide an apparatus for delivering one or more messages to a computer printer, wherein the message(s) stored within the apparatus may be easily changed to accommodate various types of computer printers and/or various testing purposes.

It is yet an additional object of the present invention to provide an apparatus for delivering one or more messages to a computer printer, which apparatus contains energy collection and storage means so that, when connected to the computer printer, the apparatus can collect and store sufficient energy from the connected printer so as to be able to deliver one or more messages to the connected computer printer without using an additional power supply or batteries.

It is yet an additional object of the present invention to provide an apparatus for delivering one or more messages to a computer printer, which apparatus contains sufficient controls so that an operator can initiate the process of delivering one or more messages to the computer printer.

It is another object of the present invention to provide a method to deliver one or more messages to a computer printer.

It is an additional object of the present invention to provide a method of delivering one or more messages to a computer printer, which method is simple enough to implement that it can be executed by relatively untrained personnel.

It is yet an additional object of the present invention to provide an apparatus and a method for delivering one or more messages to a computer printer, wherein neither the content of the message nor the type of computer printer targeted are relevant to either the design of the apparatus or its method of operation.

BRIEF DESCRIPTION OF THE DRAWINGS

FIG. 4 is a table linking functions shown in FIG. 2 to pin numbers and functions shown in FIG. 3.

FIGS. 5–10 are representative test patterns generated by the present invention.

DESCRIPTION OF THE PREFERRED EMBODIMENTS

Figure 1:
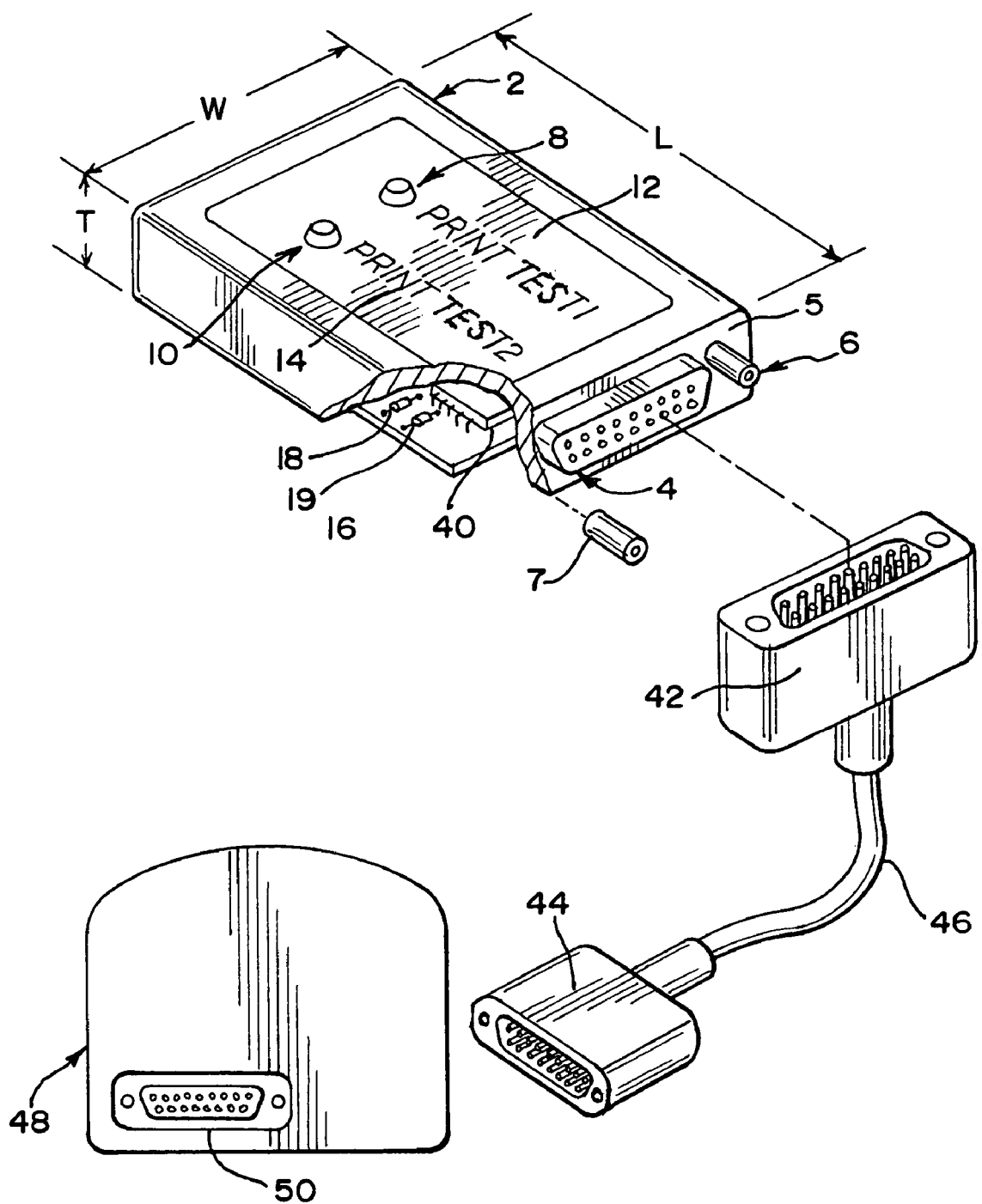
FIG. 1 is a break-away perspective depicting the preferred embodiment of the present invention.

FIG. 1 illustrates the preferred embodiment of the present invention. A housing 2 whose approximate dimensions L=2.75 in., W=2.25 in., T=0.75 in, are such that the housing 2 can be held readily in one hand. Housing 2 encloses and supports a connector 4, a printed circuit board 16 (viewed through the break-away corner of the housing), and two push-buttons 8 and 10.

Also shown is a connector mount 6 and a second connector mount 7 (shown displaced to accommodate the breakout view). The portion of printed circuit board 16 seen in the break-away contains a microcontroller 40 and two electronic components 18 and 19. Imprinted on housing 2 and identifying the functions of pushbuttons 8 and 10 are respective indicia legends, "PRINT TEST 1" 12 and "PRINT TEST 2" 14.

Connector 4 shown is of the type commonly known as "DB25F". It protrudes through a face 5 of housing 2 and serves as the point of connection between the present invention and the computer printer 48. In the preferred embodiment, cable 46 completes the connection to computer printer 48 (although the present invention can be configured such that there is no need for such a cable 46). Connector 42, mounted on one end of cable 46 mates with connector 4 of the present invention. Connector 44, mounted on the other end of cable 46, mates with connector 50 located on computer printer 48. Because cable 46 is a type normally used to connect a computer printer to a computer (not shown in FIG. 1), cable 46 is widely available wherever computer printers are used.

The method of the present invention of sending a message to the computer printer 48 requires two steps. At Step 1, the operator connects the apparatus of the present invention to computer printer 48, either directly or by using cable 46 as described above, and then turns the power on computer printer 48. At Step 2, the operator depresses either pushbutton 8 or pushbutton 10. Either pushbutton sends a message to computer printer 48, which message differs from the message sent by the other pushbutton. By choosing a particular pushbutton, an operator sends different messages to computer printer 48. Of course, more than two pushbuttons may be utilized. Each message will control the printer to print a pattern.

Message(s) delivered by the present invention are used to test any type of printer. The following discussion describes sample messages representative of some (but not all) types of computer printers.

Figures 5, 7:
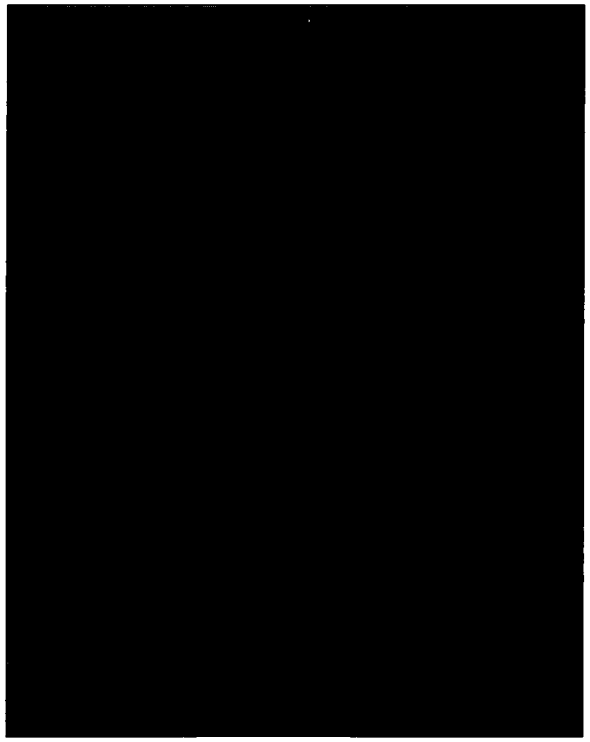
Figure 6:
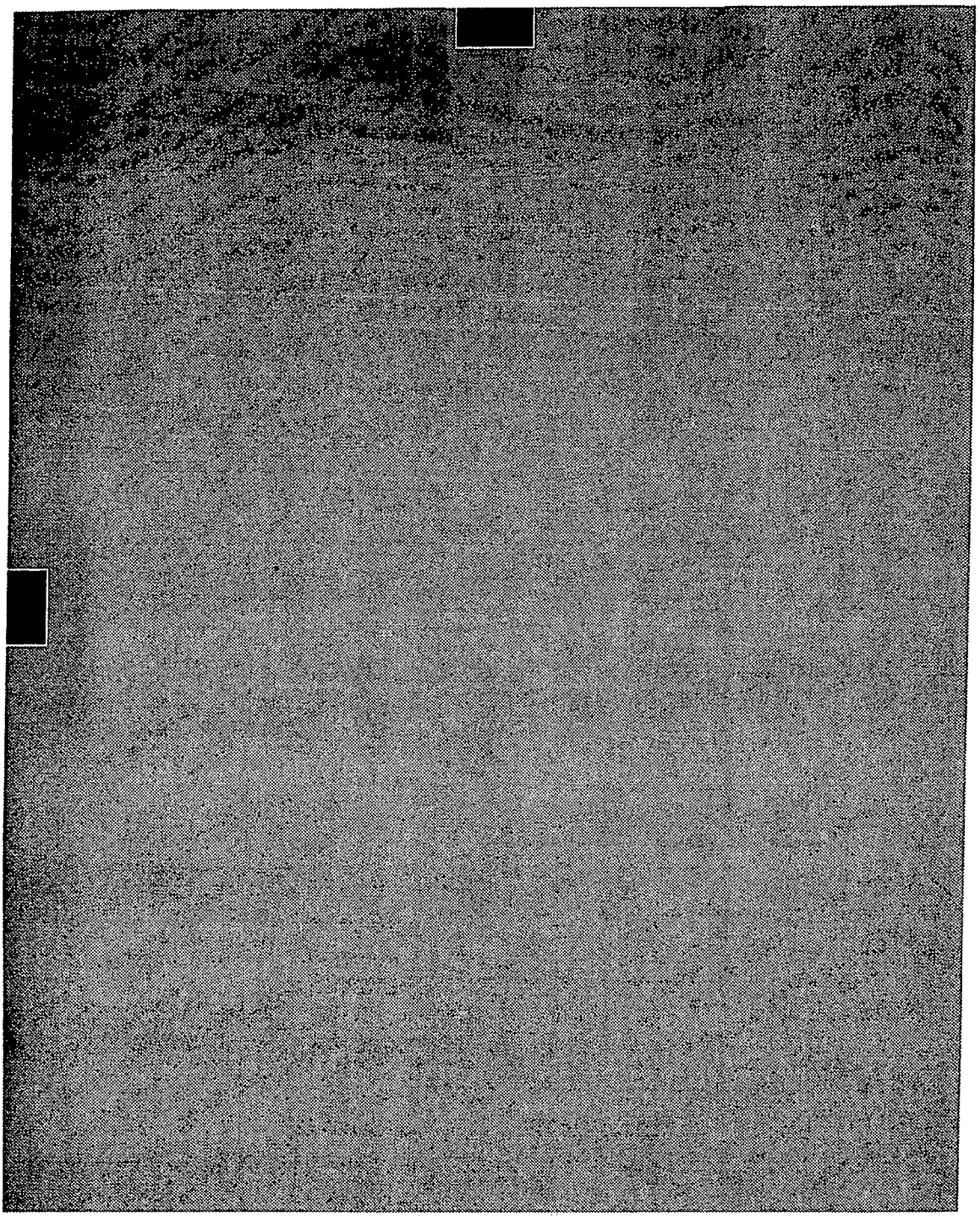
Figure 8:
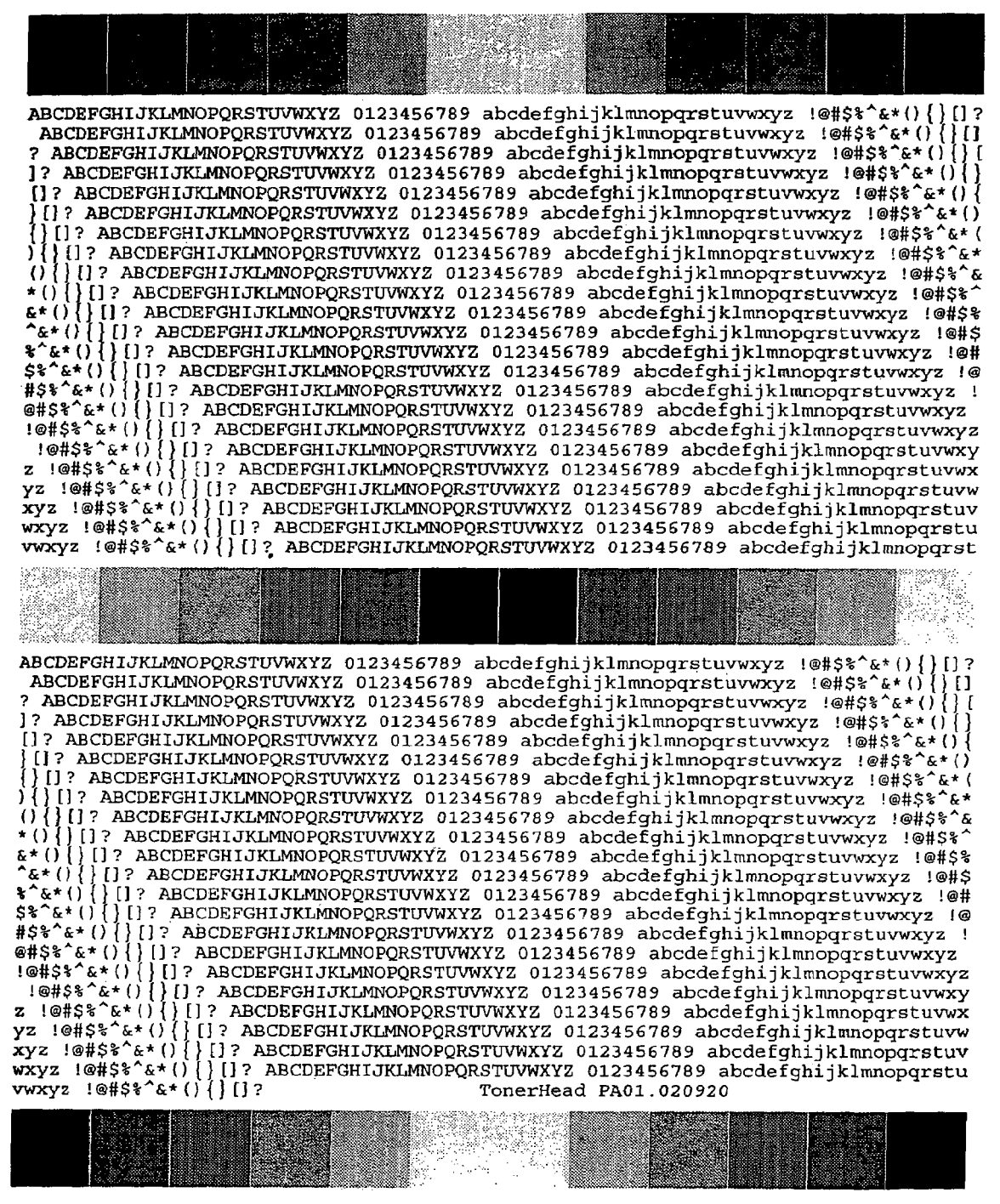

For example, if computer printer 48 is a monochrome laser printer, depressing pushbutton 8 delivers a message to computer printer 48 which causes computer printer 48 to print the test patterns depicted in FIGS. 5–8. FIG. 5 is a blank page, printed to test the printer's mechanical functions and to ensure proper paper orientation. FIG. 6 is a pattern of 50% gray scale across the entire page with a pair of special symbols printed at the edges to test "ghosting" and "bleeding". FIG. 7 is a sheet printed entirely in black, which tests the ability of computer printer to demagnetize its print drum and eliminate static charge from the printed sheet. FIG. 8 is an alphanumeric pattern interspersed with arrays of varying gray scale gradients.

Alternatively, depressing pushbutton 10 delivers a message to computer printer 48 which causes only the test pattern in FIG. 7 to be printed. This pattern is used to prepare computer printer 48 for shipping or for other maintenance purposes.

Figure 9:
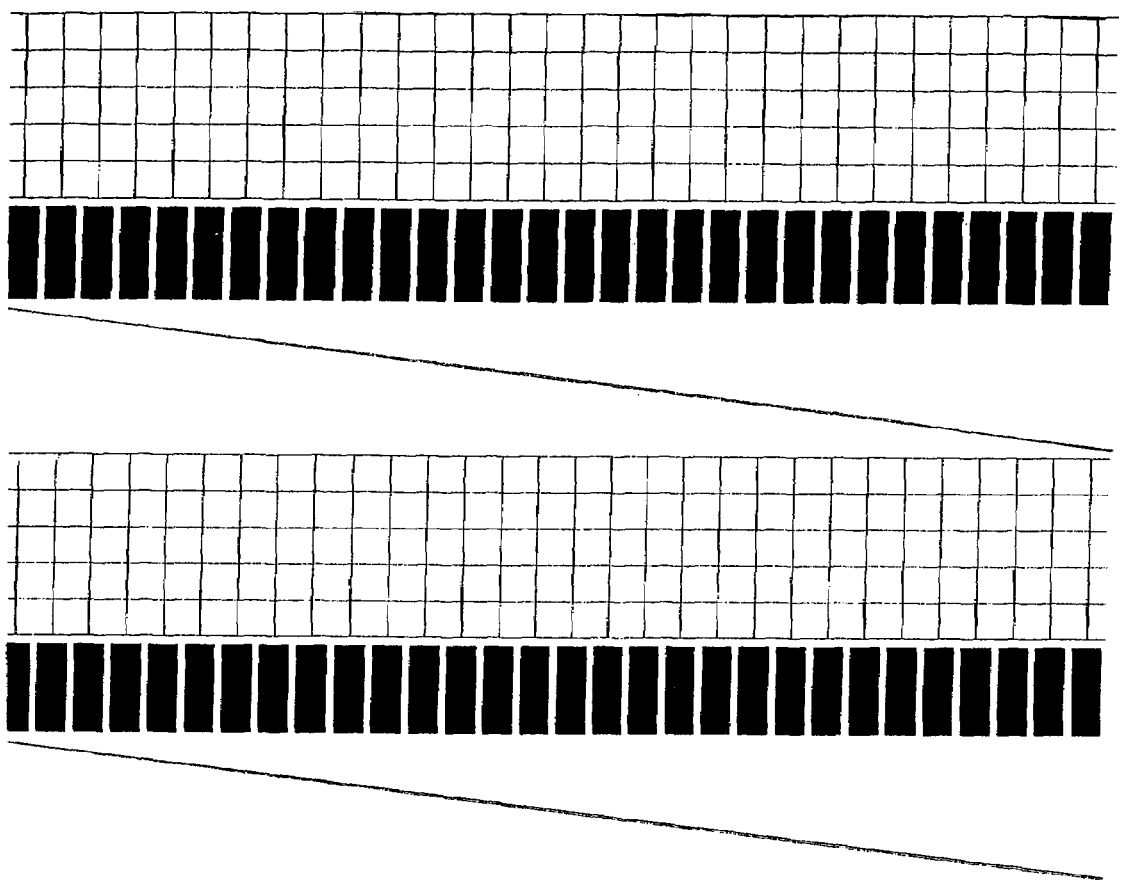

If computer printer 48 is a color inkjet printer, depressing pushbutton 8 delivers a message to computer printer 48 to print the test patterns depicted in FIG. 9. FIG. 9 is a sheet printed with a grid of empty boxes interspersed with an array of filled rectangles and some diagonal lines. Because computer 48 is a color printer, the delivered message will instruct computer printer 48 to repeat the same test page printed in each of the three basic colors, cyan, magenta and yellow.

Figure 10:
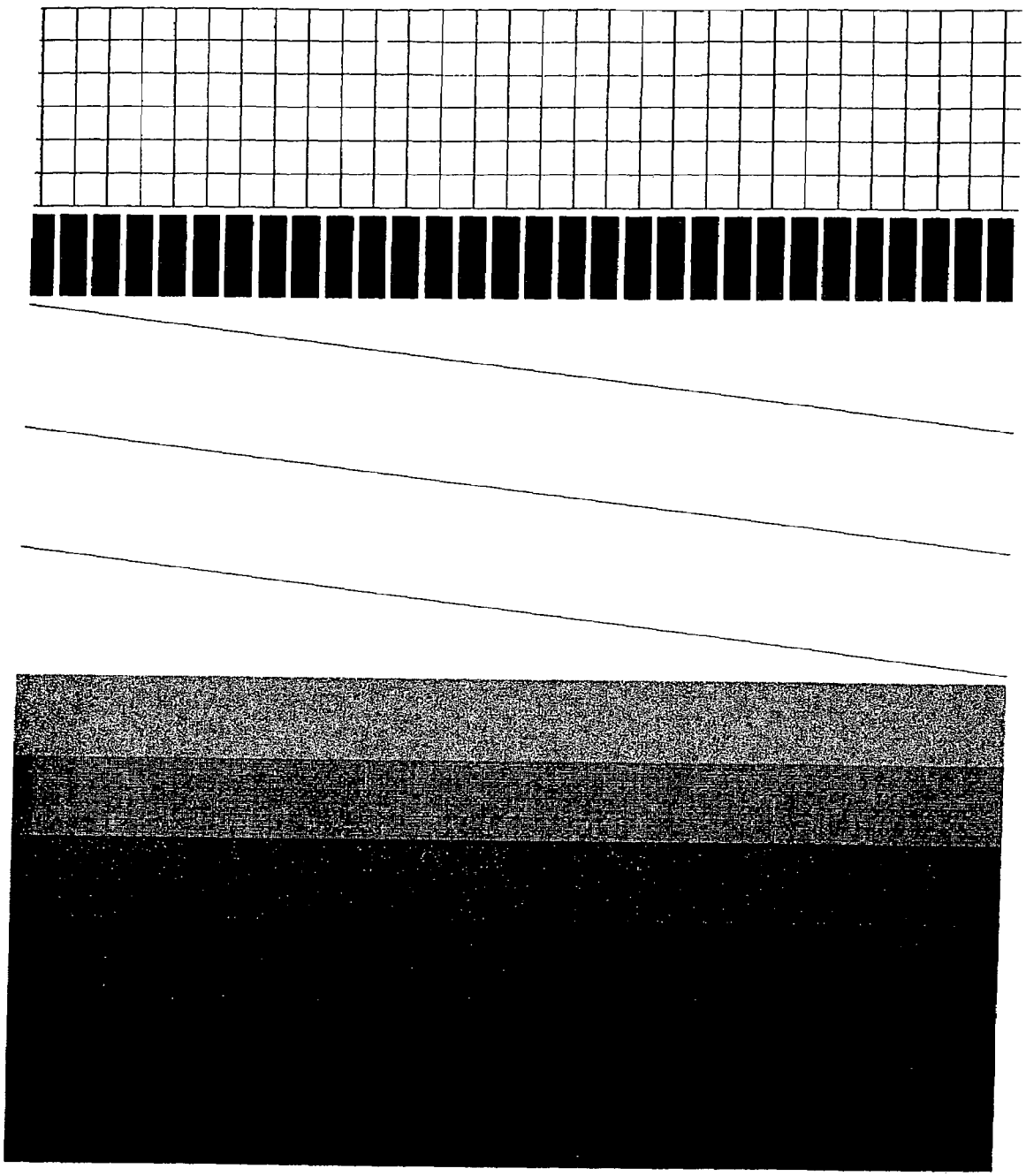

Alternatively, depressing pushbutton 10 delivers a message to computer printer 48 which causes the test pattern in FIG. 10 to be printed in black/white. This pattern incorporates all of the elements of FIG. 9 with the addition of a gradient gray scale (10% gray to 90% gray).

If computer printer 48 is a color laser printer, depressing pushbutton 8 delivers a message to computer printer 48 which causes computer printer 48 to print the test patterns depicted in FIGS. 5, 6, 7 and 8. FIG. 5, a blank page, is printed to test printer mechanical functions and to ensure proper paper orientation. FIG. 6 is a pattern of 50% gray scale across the entire page with a pair of special symbols printed at the edges to test "ghosting" and "bleeding". Because computer printer 48 is a color printer, FIG. 6 is repeated for each of the three colors (magenta, yellow, cyan). FIG. 7, a sheet printed entirely in black, tests the ability of computer printer to demagnetize its print drum and eliminate static charge from the printed sheet. FIG. 8 is an alphanumeric pattern interspersed with dot patterns of varying densities.

Alternatively, depressing pushbutton 10 delivers a message to computer printer 48 which causes the test pattern in FIG. 7 (black only) to be printed. This pattern is used to prepare computer printer 48 for shipping or for other maintenance purposes.

In this manner, a variety of messages serving a variety of purposes can be stored in the present invention and subsequently delivered to computer printer 48, merely at the push of a button. The printing method used by any computer printer to which the present invention may be connected is not intrinsic to the design or operation of the present invention.

As described above, the embodiment depicted in FIG. 1 uses cable 46, in association with connector 4, to complete the connection to computer printer 48. In an alternative embodiment, connector 4 on face 5 is replaced with a connector similar to connector 44 from cable 46, enabling the present invention to be connected directly to connector 50 of computer printer 48, thereby eliminating the need for cable 46.

Figure 2:
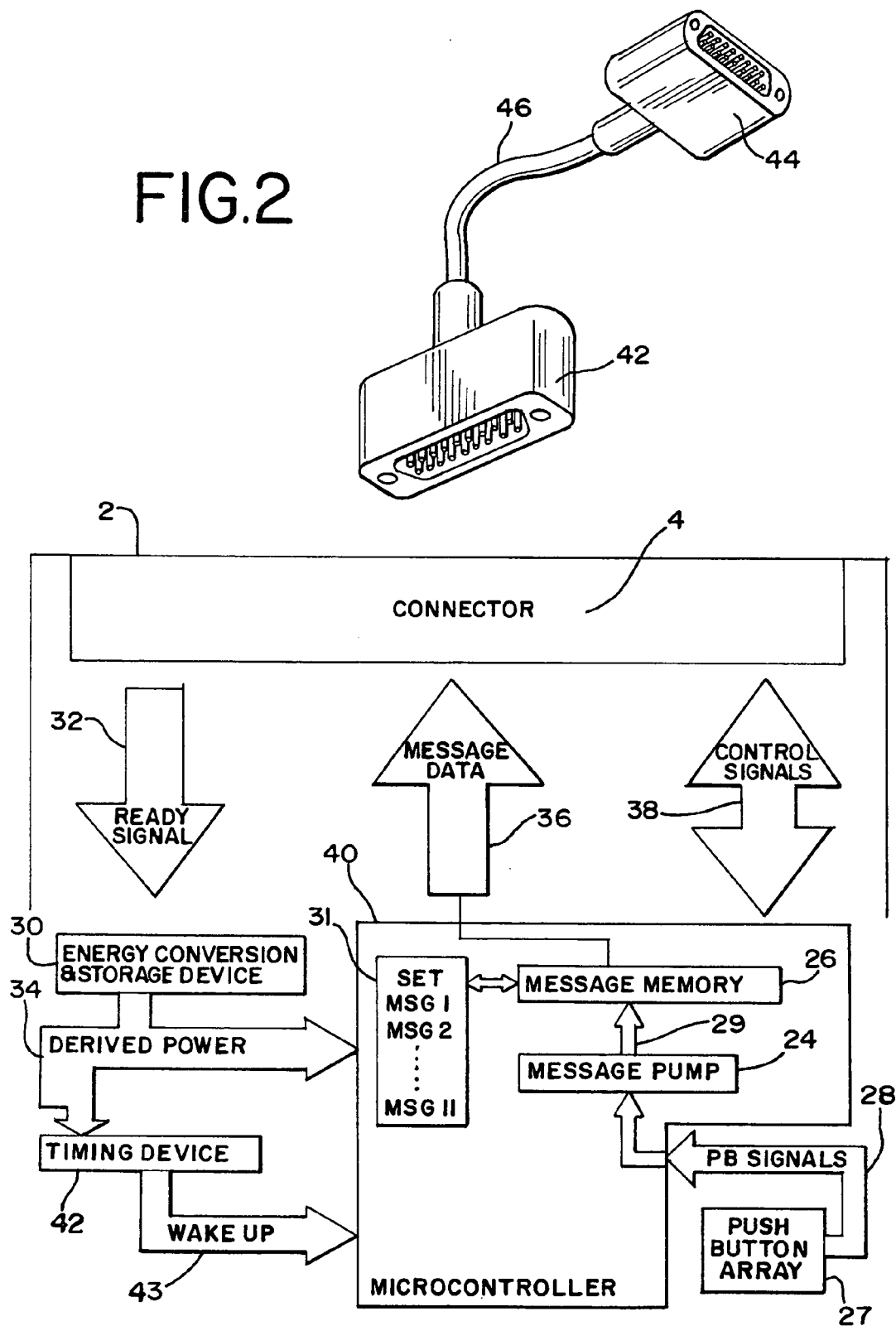
FIG. 2 is a block diagram of the preferred embodiment of the present invention depicted in FIG. 1.

FIG. 2 is a block diagram of the preferred embodiment of the present invention depicted in FIG. 1. As described above, connector 4, either directly or via optional cable 46, connects the present invention to the computer printer 48 (Ref. FIG. 1). Referring to FIG. 2, a "READY" signal 32, indicating that computer printer 48 is powered up and ready to be tested, is received from computer printer 48 (Ref. FIG. 1) via connector 4. This "READY" signal 32 is routed to Energy Conversion and Storage Device 30 where it is converted into energy, which energy is then stored and distributed throughout the present invention in the form of derived power 34. Derived power 34 enables the present invention to deliver one or more messages to computer printer 48 without the requirement of an additional power source or batteries. Of course, the present invention could be configured such that the energy needed to operate the device is obtained from a battery or through a power cord to a wall outlet.

Derived Power 34 is routed to microcontroller 40 and timing device 42. Microcontroller 40 may be any commercially available micro computer. As is characteristic in such microcontrollers, various internal elements are organized, either at the time of manufacture (dedicated), or under control of a set of programmed instructions (programmable), to perform desired functions. For purposes of simplicity, such organization of elements will be referred to by their functional names. Referring to FIG. 2, message pump 29, message memory 26 and Set 31 are examples of such organization of elements.

Shortly after Timing Device 42 receives Derived Power 34, it issues a "wake up" command 43 to microcontroller 40. Microcontroller 40, now in an alert condition in response to "wake up" command 43, monitors Control Signals 38 which it receives from computer printer 48 (Ref. FIG. 1) via connector 4. At the same time, Message Pump 24 section of microcontroller 40 monitors the state of Pushbutton Array 27 which state it receives via PB Signals 28.

When an operator depresses one of the pushbuttons in Pushbutton Array 27, PB Signals 28 changes state. Message Pump 24 detects and decodes the change in state and then sends Message Selector signal 29 to Message Memory 26 section of microcontroller 40. Message Selector signal 29 instructs Message Memory 26 which one of the Set 31 of messages, previously stored in Message Memory 26, is selected. Then, under direction of microcontroller 40, Message Memory 26 converts the selected message into Message Data 36, a sequence of digital signals that computers printers use to accomplish printing of a document or image, as understood by one having ordinary skill in the art. Message Data 36 is then conveyed to computer printer 48 (Ref. FIG. 1) via connector 4. Microcontroller 40 is controlled by a set of steps or a program which is used to operate the preferred embodiment of the printer tester described herein. A sample listing of the source code for such a program follows:

TestMessager SourceCode

```
.device AT90S2313
.equ    SREG    =$3f
.equ    SPL     =$3d
.equ    GIMSK   =$3b
.equ    GIFR    =$3a
.equ    MCUCR   =$35
.equ    PORTB   =$18
.equ    DDRB    =$17
.equ    PINB    =$16
.equ    PORTD   =$12
.equ    DDRD    =$11
.equ    PIND    =$10
;***** Bit Definitions
.equ    SP7     =7
.equ    SP6     =6
.equ    SP5     =5
.equ    SP4     =4
.equ    SP3     =3
.equ    SP2     =2
.equ    SP1     =1
.equ    SP0     =0
.equ    INT1    =7
.equ    INT0    =6
.equ    PB7     =7
.equ    PB6     =6
.equ    PB5     =5
.equ    PB4     =4
.equ    PB3     =3
.equ    PB2     =2
.equ    PB1     =1
.equ    PB0     =0
.equ    DDB7    =7
.equ    DDB6    =6
.equ    DDB5    =5
.equ    DDB4    =4
.equ    DDB3    =3
.equ    DDB2    =2
.equ    DDB1    =1
.equ    DDB0    =0
.equ    PINB7   =7
.equ    PINB6   =6
.equ    PINB5   =5
.equ    PINB4   =4
.equ    PINB3   =3
.equ    PINB2   =2
.equ    PINB1   =1
.equ    PINB0   =0
.equ    PD6     =6
.equ    PD5     =5
.equ    PD4     =4
```

-continued

TestMessager SourceCode

```
.equ    PD3     =3
.equ    PD2     =2
.equ    PD1     =1
.equ    PD0     =0
.def    XL      =r26
.def    XH      =r27
.def    YL      =r28
.def    YH      =r29
.def    ZL      =r30
.def    ZN      =r31
.equ    RAMEND  =$DF    ;Last On-Chip SRAM Location
.CSEG
.0RG 0
            rjmp    Reset
            rjmp    Intup0
            rjmp    Intup1
.0RG $010
        Reset:
            ldi     r16,$0ff
            ldi     r17,$0ff
            ldi     r18,$0f
        Setup:
            dec     r16
            brne    setup
            dec     r17
            brne    setup
            dec     r18
            brne    setup
            ldi     r16,RAMEND
            out     SPL,r16
            ldi     r16,$ff
            out     PORTB,r16
            out     DDRB,r16
            out     PORTD,r16
            ldi     r16,$02
            out     DDRD,r16
            ldi     r16,$02a
            out     MCUCR,r16
            in      r16,SREG
            ori     r16,$80
            out     SREG,r16
            ldi     r16,$0c0
            out     GIMSK,r16
        Main:
            nop
            sleep
            nop
            rjmp    Main
        XmtStg:
            lpm
            sbrc    r0,7
            ret
            rcall   XmtByt
            adiw    ZL,1
            rjmp    XmtStg
        XmtByt:
            sbic    PIND,0
            rjmp    XmtByt
            out     PORTB,r0
            ldi     r16,$7c
            out     PORTD,r16
        WaiBsy:
            sbis    PIND,0
            rjmp    WaiBsy
            ldi     r16,$7e
            out     PORTD,r16
            ret
        Intup0:
            rjmp    Button5
        Intup1:
            sbis    PIND,6
            rjmp    Button1
            sbis    PIND,5
            rjmp    Button2
            sbis    PIND,4
            rjmp    Button3
            rjmp    Button4
```

-continued

TestMessager SourceCode

```
        Button2:
            rjmp    blnk
        BlnkPage:
            .db 0x1b,0x26,0x6c,0x30,0x4f ;portrait
            .db "BLANK ",0x1b, 0x45,255
        blnk:
            ldi     ZH,high(2*BlnkPage)
            ldi     ZL,low(2*BlnkPage)
            rcall   XmtStg
            rjmp    PrnTest
        TestGph1:
            .db 0x1b,0x2a,"p0x0y"
            .db 0x1b,0x2a,"c198a198b100g2P"
            .db 0x1b,0x2a,"p200x0Y"
            .db 0x1b,0x2a,"c198a198b90g2P"
            .db 0x1b,0x2a,"p400x0Y"
            .db 0x1b,0x2a,"c198a198b70g2P"
            .db 0x1b,0x2a,"p600x0Y"
            .db 0x1b,0x2a,"c198a198b50g2P"
            .db 0x1b,0x2a,"p800x0Y"
            .db 0x1b,0x2a,"c198a198b30g2P"
            .db 0x1b,0x2a,"p1000x0Y"
            .db 0x1b,0x2a,"c198a198b10g2P"
            .db 0x1b,0x2a,"p1200x0Y"
            .db 0x1b,0x2a,"c198a198b10g2P"
            .db 0x1b,0x2a,"p1400x0Y"
            .db 0x1b,0x2a,"c198a198b30g2P"
            .db 0x1b,0x2a,"p1600x0Y"
            .db 0x1b,0x2a,"c198a198b50g2P"
            .db 0x1b,0x2a,"p1800x0Y"
            .db 0x1b,0x2a,"c198a198b70g2P"
            .db 0x1b,0x2a,"p2000x0Y"
            .db 0x1b,0x2a,"c198a198b90g2P"
            .db 0x1b,0x2a,"p2200x0Y"
            .db 0x1b,0x2a,"c198a198b100g2P"
            .db 0x1b,0x2a,"p0x1400Y"
            .db 0x1b,0x2a,"c198a198b10g2P"
            .db 0x1b,0x2a,"p200x1400Y"
            .db 0x1b,0x2a,"c198a198b30g2P"
            .db 0x1b,0x2a,"p400x1400Y"
            .db 0x1b,0x2a,"c198a198b50g2P "
            .db 0x1b,0x2a,"p600x1400Y"
            .db 0x1b,0x2a,"c198a198b70g2P"
            .db 0x1b,0x2a,"p800x1400Y"
            .db 0x1b,0x2a,"c198a198b90g2P"
            .db 0x1b,0x2a,"p1000x1400Y"
            .db 0x1b,0x2a,"c198a198b100g2P"
            .db 0x1b,0x2a,"p1200x1400Y"
            .db 0x1b,0x2a,"c198a198b100g2P"
            .db 0x1b,0x2a,"p1400x1400Y"
            .db 0x1b,0x2a,"c198a198b90g2P"
            .db 0x1b,0x2a,"p1600x1400Y"
            .db 0x1b,0x2a,"c198a198b70g2P"
            .db 0x1b,0x2a,"p1800x1400Y"
            .db 0x1b,0x2a,"c198a198b50g2P"
            .db 0x1b,0x2a,"p2000x1400Y"
            .db 0x1b,0x2a,"c198a198b30g2P"
            .db 0x1b,0x2a,"p2200x1400Y"
            .db 0x1b,0x2a,"c198a198b10g2P"
            .db 0x1b,0x2a,"p0x2800Y"
            .db 0x1b,0x2a,"c198a198b100g2P"
            .db 0x1b,0x2a,"p200x2800Y"
            .db 0x1b,0x2a,"c198a198b90g2P"
            .db 0x1b,0x2a,"p400x2800Y"
            .db 0x1b,0x2a,"c198a198b70g2P"
            .db 0x1b,0x2a,"p600x2800Y"
            .db 0x1b,0x2a,"c198a198b50g2P"
            .db 0x1b,0x2a,"p800x2800Y"
            .db 0x1b,0x2a,"c198a198b30g2P"
            .db 0x1b,0x2a,"p1000x2800Y"
            .db 0x1b,0x2a,"c198a198b10g2P"
            .db 0x1b,0x2a,"p1200x2800Y"
            .db 0x1b,0x2a,"c198a198b10g2P"
            .db 0x1b,0x2a,"p1400x2800Y"
            .db 0x1b,0x2a,"c198a198b30g2P"
            .db 0x1b,0x2a,"p1600x2800Y"
            .db 0x1b,0x2a,"c198a198b50g2P"
```

-continued

TestMessager SourceCode

```
            .db 0x1b,0x2a,"p1800x2800Y"
            .db 0x1b,0x2a,"c198a198b70g2P"
            .db 0x1b,0x2a,"p2000x2800Y"
            .db 0x1b,0x2a,"c198a198b90g2P"
            .db 0x1b,0x2a,"p2200x2800Y"
            .db 0x1b,0x2a,"c198a198b100g2P",255
PrnTest:
            ldi ZH,high(2*TestGph1)
            ldi ZL,low(2*TestGph1)
            rcall xmtStg
rjmp SndTxt
    Wrapon:
            .db 0x1b,0x26,0x73,0x30,0x43
            .db 0x1b,0x26,0x6c,0x30,0x4f ;portrait
            .db 0x1b,0x2a,"p0x260Y",255 ;paral at
    Para2:
            .db 0x1b,0x2a,"p0x1660Y",255
    BPole:
            .db "ABCDEFGHIJKLMNOPQRSTUVWXYZ
0123456789 abcdefghijklmnopqrstuvwxyz
!@#$%^&*(){}[]? ",255
    Close1:
            .db "ABCDEFGHIJKLMNOPQRSTUVWXYZ
0123456789 abcdefghijklmnopqrst",255
    Close2:
            .db "      TonerHead PA01R04.030530",$1b,$45,255
    SndTxt:
            ldi ZH,high(2*WrapOn)
            ldi ZL,low(2*WrapOn)
            rcall XmtStg
            ldi r20,22
    BPLoop:
            ldi ZH,high(2*BPole)
            ldi ZL,low(2*Bpole)
            rcall XmtStg
            dec r20
            brne BPloop
            ldi ZH,high(2*Close1)
            ldi ZL,low(2*Close1)
            rcall XmtStg
            ldi ZH,high(2*Para2)
            ldi ZL,low(2*Para2)
            rcall XmtStg
            ldi r20,22
    BPLoop2:
            ldi ZH,high(2*BPole)
            ldi ZL,low(2*Bpole)
            rcall XmtStg
            dec r20
            brne BPloop2
    SndVer2:
            ldi ZH,high(2*Close2)
            ldi ZL,low(2*Close2)
            rcall XmtStg
            rjmp gray
    GrayPage:
            .db 0x1b,0x26,0x6c,0x30,0x4f ;portrait
            .db 0x1b,0x2a,0x70,0x30,0x78,0x30,0x59
            .db
0x1b,0x2a,0x63,0x32,0x33,0x39,0x39,0x61,0x33,0x30,0x34,0x39,0x62,
0x35,0x30,0x67,0x32,0x50,
            .db 0x1b,0x2a,"p1100x0Y"              ;top
            .db 0x1b,0x2a,"c200a100b1P"
            .db 0x1b,0x2a,"p1105x0Y"
            .db 0x1b,0x2a,"c190a95b100g2P"
            .db 0x1b,0x2a,"p0x1400Y"              ;left
            .db 0x1b,0x2a,"c100a200b1P"
            .db 0x1b,0x2a,"p0x1405Y"
            .db 0x1b,0x2a,"c95a190b100g2P"
            .db 0x1b,0x45,255
    gray:
            ldi ZN,high(2*GrayPage)
            ldi ZL,low(2*GrayPage)
            rcall XmtStg
```

-continued

TestMessager SourceCode

```
            rjmp blk
    BlackP:
            .db 0x1b,0x26,0x6c,0x30,0x4f ;portrait
            .db 0x1b,"*p0x0Y"
            .db 0x1b,"*c2399a3049b100g2P"
            .db 0x1b,0x2a,"p1150x0Y"
            .db 0x1b,0x2a,"c100a10b1P"
            .db 0x1b,0x2a,"p0x1500Y"
            .db 0x1b,0x2a,"c10a100b1P"
            .db 0x1b,0x45,255
    Blk:
            ldi ZH,high(2*BlackP)
            ldi ZH,low(2*BlackP)
            rcall XmtStg
            reti
    Button4:
            ldi ZH,high(2*BlackP)
            ldi ZL,low(2*BlackP)
            rcall XmtStg
    Button1:
    Button3:
    Button5:
            reti
```

Connector 4 shown in FIG. 2 need not be a "DB25F" type. It may be any connector type which, when connected to a computer printer, is capable of providing signals equivalent in function and form to those signals shown in FIG. 2. Similarly, connector 44 of cable 46 may be selected to be a type compatible with the particular computer printer chosen to receive the message(s) delivered by the present invention.

Figure 3:
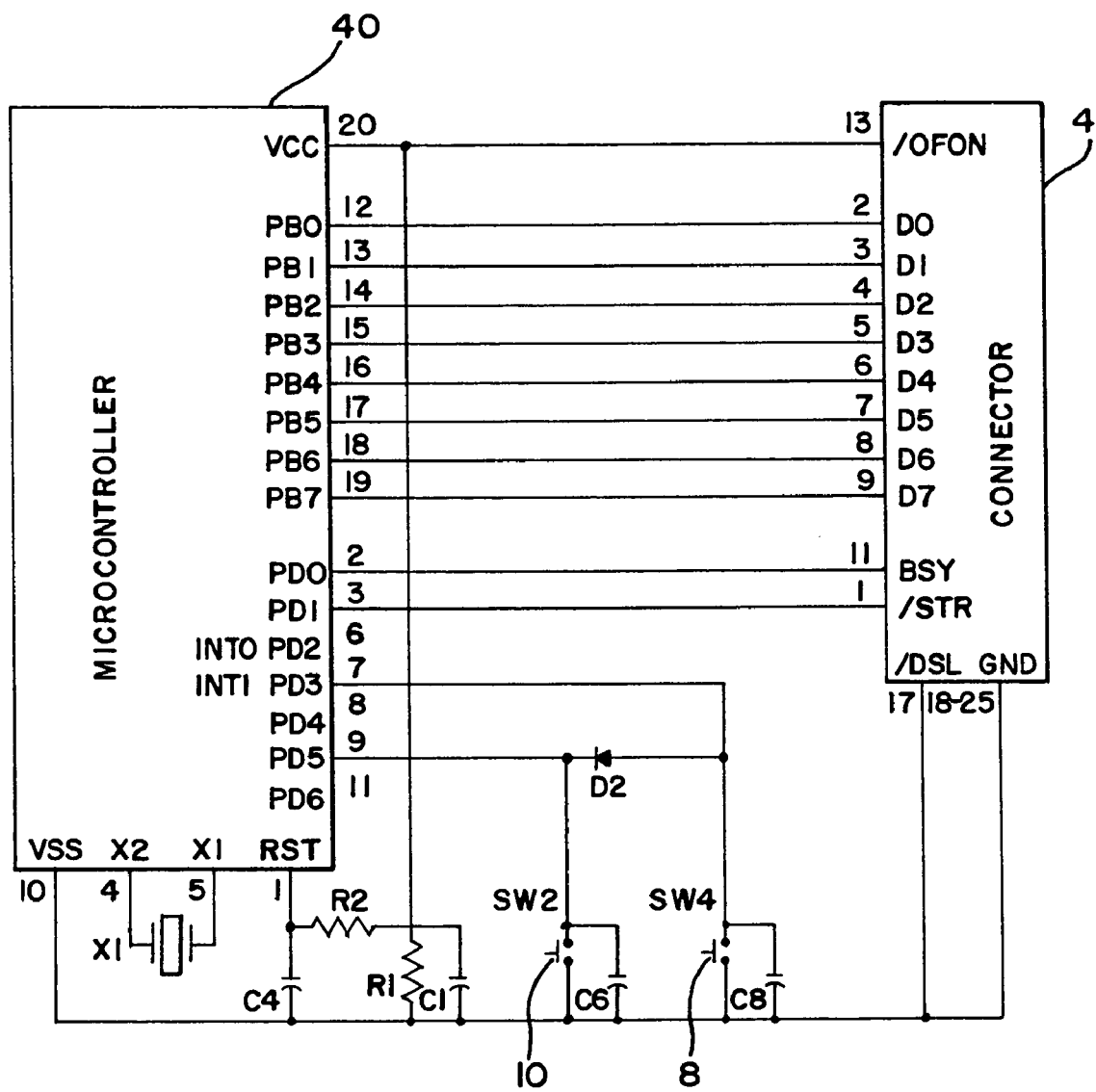
FIG. 3 is a schematic drawing of the preferred embodiment of the present invention depicted in FIG. 1.

FIG. 3 is a schematic of the embodiment of the present invention depicted by FIG. 1 and FIG. 2. FIG. 4 is a table which shows the relationship between device pins on connector 4 (FIG. 3), device pins on microcontroller 40 (FIG. 3) and the corresponding function names of FIG. 2. For example, the Message Data 36 function of FIG. 2 contains 8 signal lines in the schematic of FIG. 3. The FIG. 4 table shows these signals corresponding to microcontroller 40 pins 12–19 and to connector 4 pins 2–9.

As described above, referring to FIGS. 1, 2, 3 and 4, the operator connects the present invention to computer printer 48 (either directly or by using cable 46 of FIG. 1) and then applies power to computer printer 48. Computer printer 48, at power-on, delivers a 5 volt signal ("READY") to pin 13 of connector 4. This signal is applied to capacitor C1 which charges up, thereby storing energy which is subsequently used by microcontroller 40, via pin 20, as a power source. Enough energy is stored, by this means, to enable the present invention to deliver one or more messages to computer printer 48.

The "READY" signal, described above, is also applied through resister R2 to capacitor C4, which, after a time delay, charges up and generates a "WAKE UP" command 43 signal, which signal is applied to pin 1 of microcontroller 40. This "WAKE UP" command 43 signal activates microcontroller 40 which, under control of its internal program, detects the state of Control Signals 38 applied to its own pins 2 and 3, respectively, through connector 4 pins 11 and 1. When the states of Control Signals 38 correctly match conditions stored in the internal program, microcontroller 40 enters a "enabled to monitor pushbuttons" mode. In this mode, microcontroller 40 continuously monitors the states of its own pin 7, (pushbutton 8, SW4), and pin 9 (pushbutton 10, SW2.

When the operator depresses either pushbutton 8 or pushbutton 10, signaling a desire to deliver a particular message to the computer printer, microcontroller 40 detects the pushbutton depression by monitoring its own pins 7 and 9.

When Pushbutton 10 is depressed, pin 9 of microcontroller 40 is grounded directly through switch SW2. Simultaneously, pin 7 of microcontroller 40 is grounded through diode D2 and switch SW2. Microcontroller 40 program logic recognizes the simultaneous grounding of pins 7 and 9 as the code for "Pushbutton 10 depressed". Microcontroller 40, in response, selects, from internal memory, the previously stored message corresponding to Pushbutton 10 and sends it out to the computer printer 48 via microcontroller 40 pins 12–19, connector 4 pins 2–9 and cable 46. This action ends Step 2.

Alternately, if the operator depresses Pushbutton 8 instead of Pushbutton 10, then only pin 7 of microcontroller 40 is grounded (grounding of pin 9 is blocked by diode D2). In this scenario, microcontroller 40 recognizes the code for "Pushbutton 8 depressed", selects, from internal memory, the message corresponding to Pushbutton 8, and, as previously described, sends it to computer printer 48, ending Step 2.

Referring to FIG. 3, quartz crystal X1 acts as a microcontroller clock support device and components R1, C6 and C8 perform unremarkable signal conditioning functions.

Figure 11:
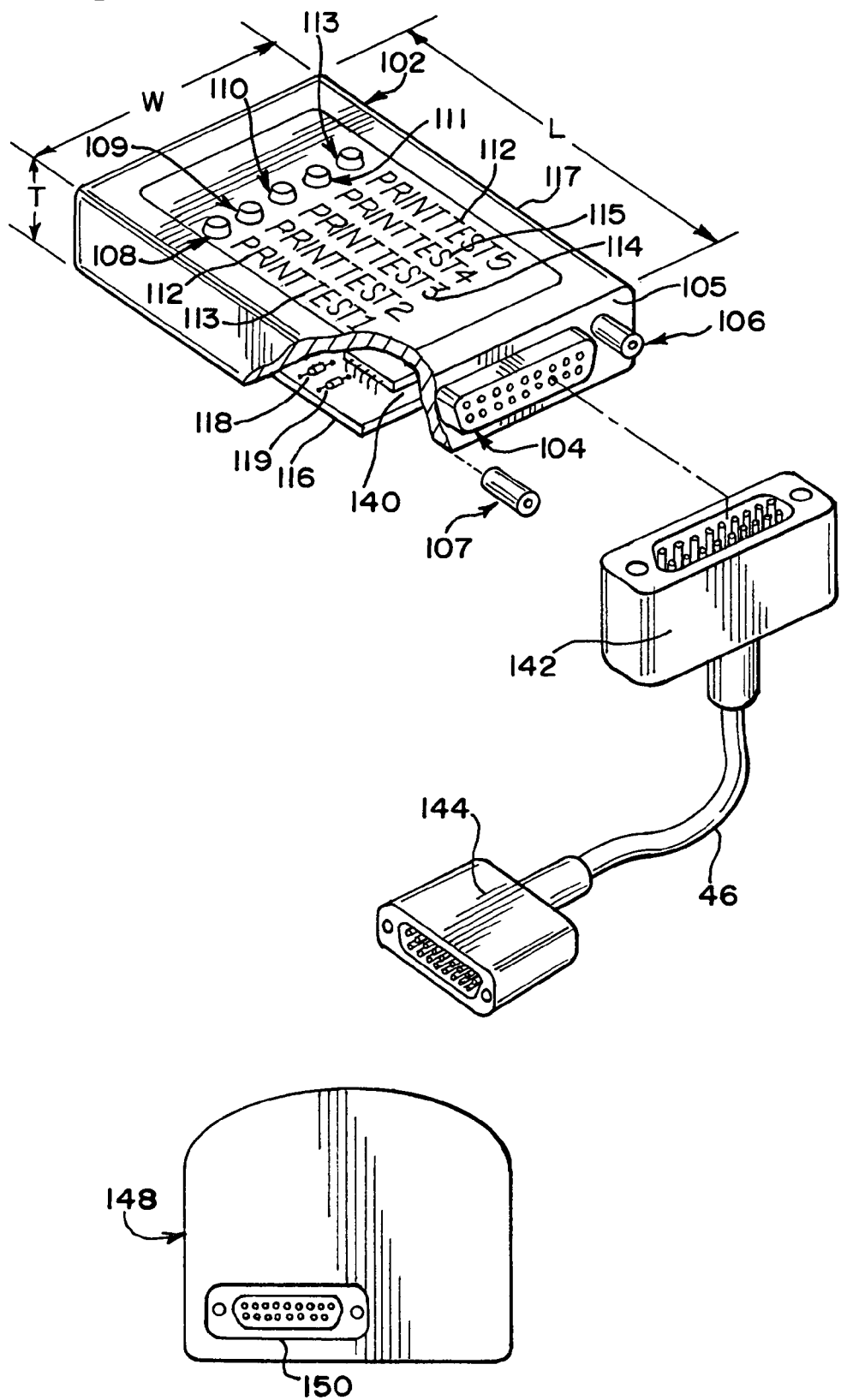
FIG. 11 is a break-away perspective depicting an alternative embodiment of the present invention.

FIG. 11 illustrates an alternative embodiment of the apparatus of the present invention. A housing 102 whose approximate dimensions L=2.75 in., W=2.25 in., T=0.75 in, are such that the housing 102 can be held readily in one hand. Housing 102 encloses and supports a connector 104, a printed circuit board 116 (viewed through the break-away corner of the housing), and push-buttons 108, 109, 110, 111 and 113.

Also shown is a connector mount 106 and a second connector mount 107 (shown displaced to accommodate the breakout view). The portion of printed circuit board 116 seen in the break-away contains a microcontroller 140 and two electronic components 118 and 119. Imprinted on housing 102 and identifying the functions of pushbuttons 108, 109, 110, 111 and 113 are respective indicia legends, "PRINT TEST 1" 112, "PRINT TEST 2" 113, "PRINT TEST 3" 114, "PRINT TEST 4" 115 and "PRINT TEST 5" 117.

Connector 104 shown is of the type commonly known as "DB25F". It protrudes through a face 105 of housing 102 and serves as the point of connection between the present invention and the computer printer 148. Cable 146 completes the connection to computer printer 148. Connector 142, mounted on one end of cable 146 mates with connector 104 of the present invention. Connector 144, mounted on the other end of cable 146, mates with connector 150 located on computer printer 148. Because cable 146 is a type normally used to connect a computer printer to a computer (not shown in FIG. 1), cable 146 is widely available wherever computer printers are used.

The method of the present invention of sending a message to the computer printer 148 requires two steps. At Step 1, the operator connects the apparatus of the present invention to computer printer 148, either directly or by using cable 146 as described above, and then turns the power on computer printer 148. At Step 2, the operator depresses one of pushbuttons 108, 109, 110, 111 or 113. The selected pushbutton causes the present invention to deliver a message to computer printer 148. Each pushbutton's message differs from that of the other pushbuttons.

Figure 12:
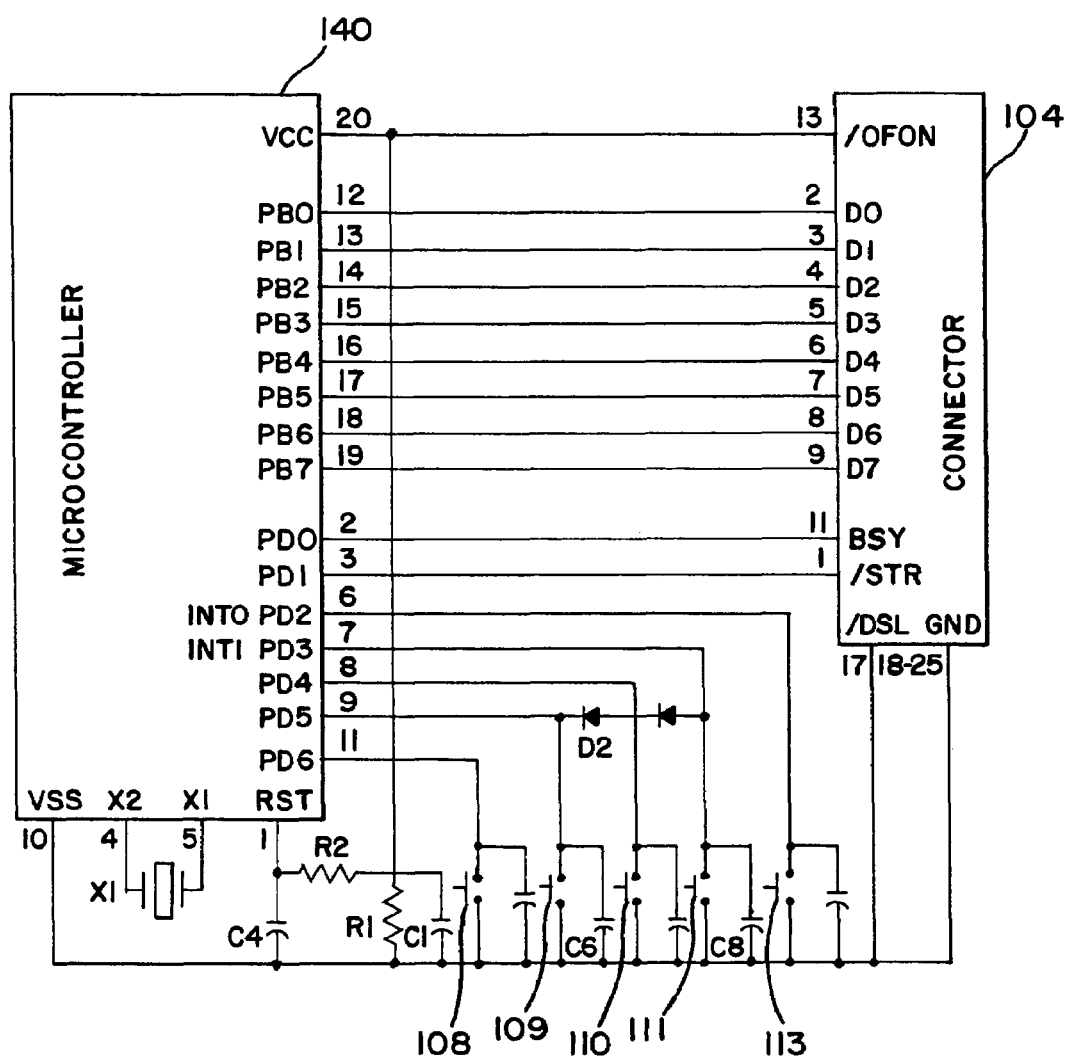
FIG. 12 is a schematic drawing of the alternate embodiment of the present invention depicted in FIG. 11.

FIG. 12 is a schematic diagram of the embodiment of the present invention depicted in FIG. 11. Referring to FIG. 12, depressing any one of the five pushbuttons (108, 109, 110, 111 or 112) sends a signal to microcontroller 140 by way of pins 11, 9, 8, 7 and 6. Microcontroller 140 processes the pushbutton signal to determine which of the 5 pushbuttons was depressed.

By this process, depressing any one of the five pushbuttons causes microcontroller 140 to deliver a unique message to computer printer 148, each message different than that delivered as a result of depressing one of the other pushbuttons. In this manner, a variety of messages serving a variety of purposes can be delivered to computer printer 148, merely at the push of a button. The printing method used by any computer printer to which the present invention may be connected is not intrinsic to the design or operation of the present invention.

Message(s) delivered by the embodiment of the present invention depicted in FIG. 11, are used to test any type of printer. The following discussion describes sample messages representative of some (but not all) types of computer printers.

For example, when computer printer 148 is a color inkjet printer, depressing pushbutton 108 delivers a message to computer printer 148 to print the test patterns depicted in FIG. 9. FIG. 9 is a sheet printed with a grid of empty boxes interspersed with an array of filled rectangles and some diagonal lines. Because computer 148 is a color printer, the delivered message will instruct computer printer 148 to repeat the same test page printed in each of the three basic colors.

Alternatively, depressing pushbutton 109 delivers a message to computer printer 148 which causes the test pattern in FIG. 10 to be printed in black/white. This pattern incorporates all of the elements of FIG. 9 with the addition of a gradient gray scale (10% gray to 90% gray).

Alternatively, depressing pushbutton 110 delivers a message to computer printer 148 which causes the test pattern in FIG. 10 to be printed in cyan. This pattern incorporates all of the elements of FIG. 9 with the addition of a gradient density cyan dot pattern.

Alternatively, depressing pushbutton 111 delivers a message to computer printer 148 which causes the test pattern in FIG. 10 to be printed in magenta. This pattern incorporates all of the elements of FIG. 9 with the addition of a gradient density magenta dot pattern.

Alternatively, depressing pushbutton 113 delivers a message to computer printer 148 which causes the test pattern in FIG. 10 to be printed in yellow. This pattern incorporates all of the elements of FIG. 9 with the addition of a gradient density yellow dot pattern.

When computer printer 148 is a color laser printer, depressing pushbutton 108 delivers a message to computer printer 148 to print the test patterns depicted in FIG. 9. FIG. 9 is a sheet printed with a grid of empty boxes interspersed with an array of filled rectangles and some diagonal lines. Because computer 148 is a color printer, the delivered message will instruct computer printer 148 to repeatedly print the test page of FIG. 9 in each of the three basic colors (magenta, yellow, cyan).

Alternatively, depressing pushbutton 109 delivers a message to computer printer 148 which causes the test pattern in FIG. 10 to be printed in black/white. This pattern incorporates all of the elements of FIG. 9 with the addition of a gradient gray scale (10% gray to 90% gray).

Alternatively, depressing pushbutton 110 delivers a message to computer printer 148 which causes the test pattern in FIG. 10 to be printed in cyan. This pattern incorporates all of the elements of FIG. 9 with the addition of a gradient density cyan dot pattern.

Alternatively, depressing pushbutton 111 delivers a message to computer printer 148 which causes the test pattern in FIG. 10 to be printed in magenta. This pattern incorporates all of the elements of FIG. 9 with the addition of a gradient density magenta dot pattern.

Alternatively, depressing pushbutton 113 delivers a message to computer printer 148 which causes the test pattern in FIG. 10 to be printed in yellow. This pattern incorporates all of the elements of FIG. 9 with the addition of a gradient density yellow dot pattern.

The above descriptions of preferred and alternative embodiments illustrate the versatility of the present invention to easily select and deliver one or more test messages to a wide variety of computer printers. In each case, the data for the message(s) to be delivered were stored in the present invention. The following discussion presents techniques used in alternative embodiments of the present invention which accomplish capture and storage of the message(s) data.

Figure 13:
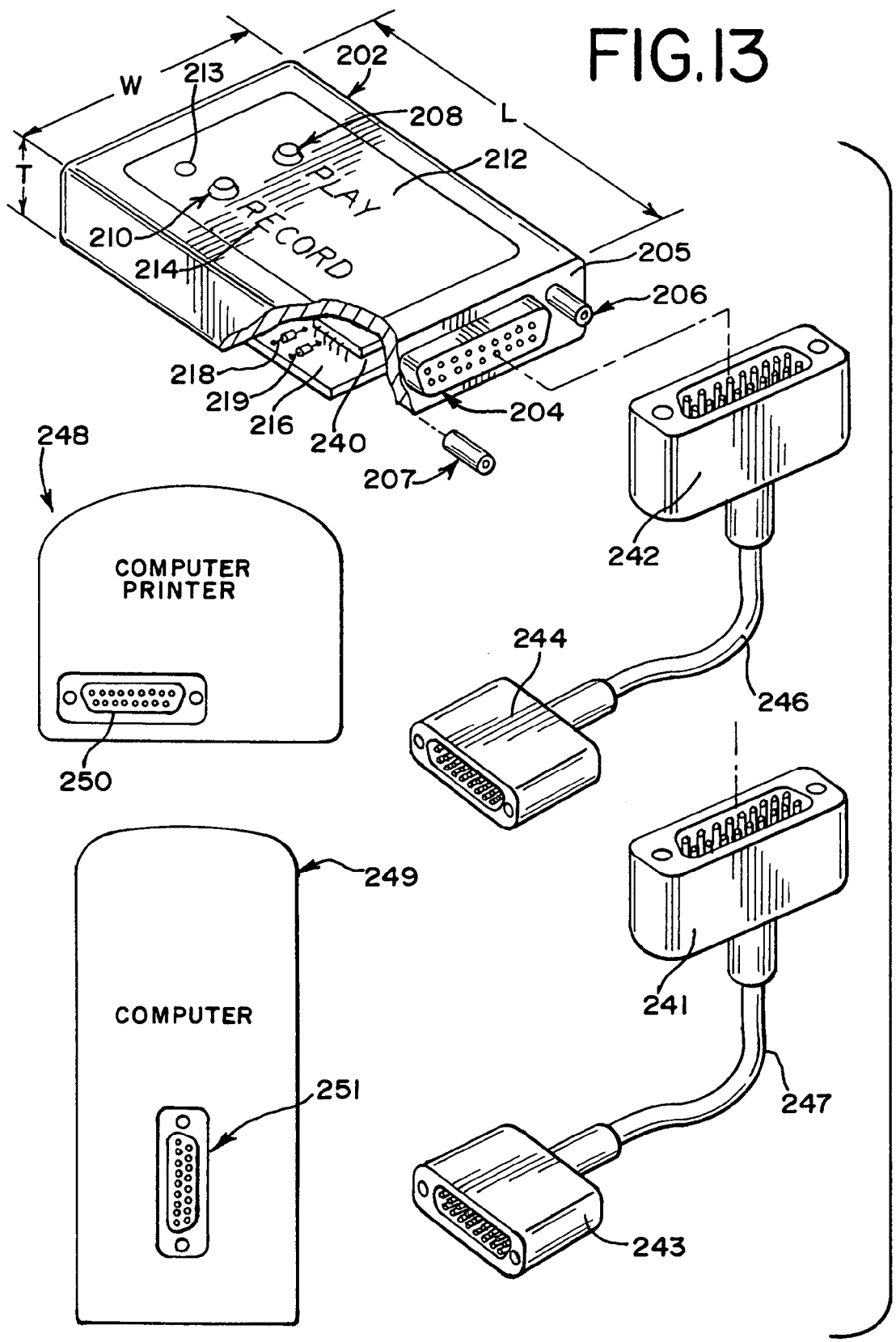
FIG. 13 is a breakaway perspective drawing of an alternative embodiment of the present invention.

FIG. 13 illustrates an alternative embodiment of the present invention. A housing 202 whose approximate dimensions L=2.75 in., W=2.25 in., T=0.75 in, are such that the housing 202 can be held readily in one hand. Housing 202 encloses and supports a connector 204, a printed circuit board 216 (viewed through the break-away corner of the housing), a lighted indicator 213 and two push-buttons 208 and 210.

Also shown in FIG. 13 is a connector mount 206 and a second connector mount 207 (shown displaced to accommodate the breakout view). The portion of printed circuit board 216 seen in the break-away contains a microcontroller 240 and two electronic components 218 and 219. Imprinted on housing 202 and identifying the functions of pushbuttons 208 and 210 are respective indicia legends, "PLAY" 212 and "RECORD" 214.

Connector 204 shown is of the type commonly known as "DB25F". It protrudes through a face 205 of housing 202 and serves as the point of connection between the present invention and either, a computer printer 248, or, a computer printer 249. Also shown are cable 246 and cable 247. Cable 246 completes a connection to computer printer 248 and cable 247 completes a connection to computer 249.

When the present invention is connected to computer printer 248, connector 242, mounted on one end of cable 246 mates with connector 204 of the present invention. Connector 244, mounted on the other end of cable 246, mates with connector 250, located on computer printer 248.

Similarly, when the present invention is connected to computer 249, connector 241, mounted on one end of cable 247 mates with connector 204 of the present invention and connector 243, mounted on the other end of cable 247, mates with connector 251 located on computer 249. Because cables 246 and 247 are a type normally used to connect a computer printer to a computer, cables 246 and 247 are widely available wherever computer printers are used.

The method of the present invention of delivering one or more messages to the computer printer 248 requires five steps. At Step 1, the operator connects the apparatus of the present invention to computer 249 (either directly or by using cable 247 as described above), and then turns the power on computer 249. Indicator 213 begins to flash. At Step 2, the operator depresses RECORD pushbutton 210 and waits for indicator light 213 to stop flashing. At Step 3, the operator disconnects the apparatus of the present invention from computer 249. At Step 4, the operator connects the apparatus of the present invention to computer printer 248, (either directly or by using cable 246 as described above) and turns power on computer printer 248. At Step 5, the operator depresses PLAY pushbutton 208.

Step 2 of the above described process results in a download of data from the computer to the present invention and storage of the downloaded data in the memory of the present invention. Completion of Step 2 is signaled when indicator light 213 stops flashing.

Figure 14:
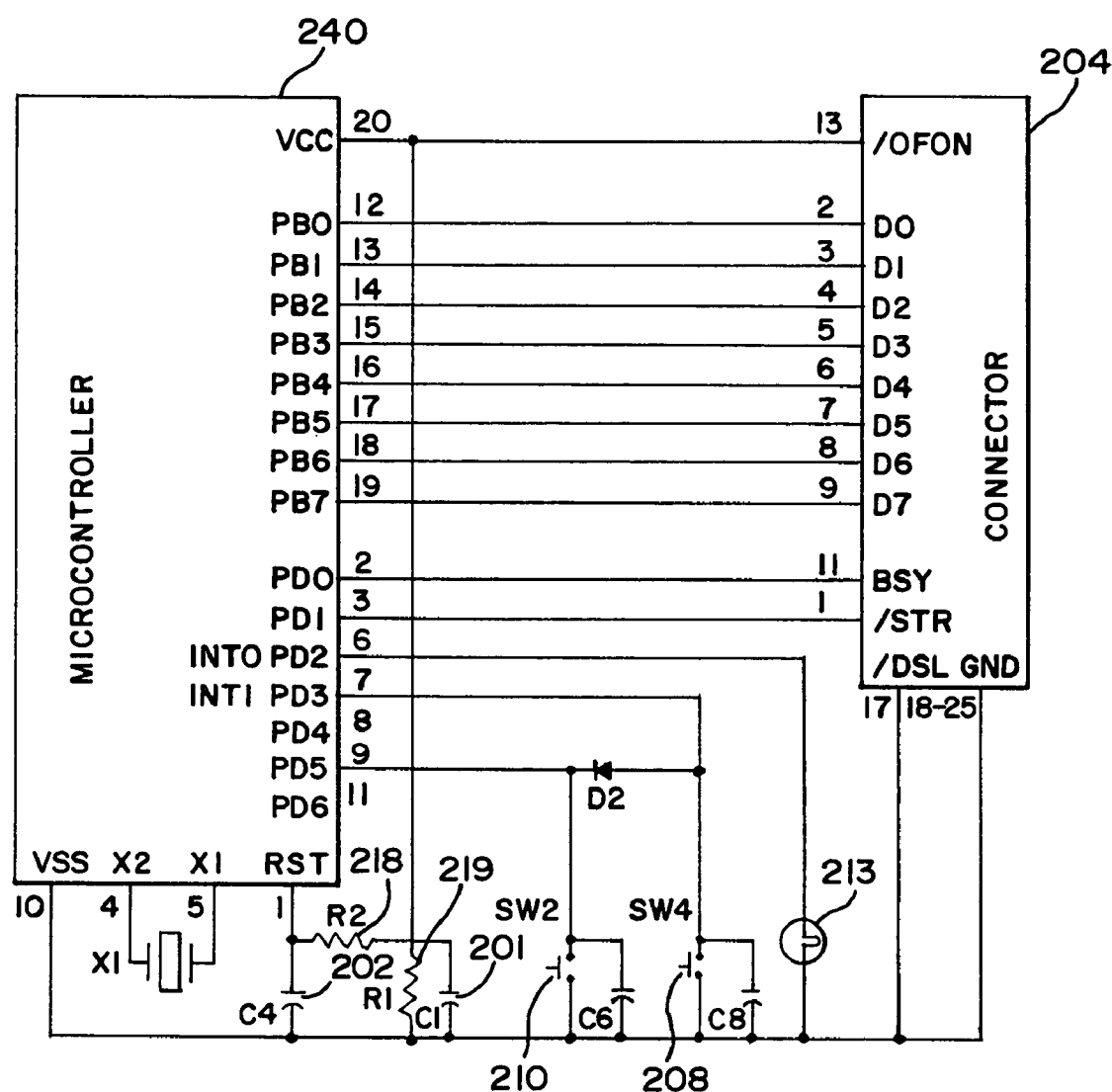
FIG. 14 is a schematic drawing of the alternative embodiment of the present invention depicted in FIG. 13.

FIG. 14 is a schematic of the FIG. 13 embodiment of the present invention. As described above, in Step 1, the operator connects the present invention to computer 249 (either directly or by using cable 247 of FIG. 13) and then applies power to computer 249. When computer 249 is powered-on, a 5 volt signal ("READY") is received on pin 13 of connector 204. This signal is applied to capacitor C1 201 which charges up, thereby storing energy which is used by microcontroller 240 at pin 20 as a power source. By this means, enough energy is stored to enable the present invention to download and store one or more messages from computer 249 and deliver one or more messages to computer printer 248.

The "READY" signal is also applied through resister R2 218 to capacitor C4 202, which, after a time delay, charges up and creates a "WAKE UP" signal which signal is applied to pin 1 of microcontroller 240. This "WAKE UP" signal activates microcontroller 240 which, under control of its internal program, detects the state of signals applied to its pins 2 and 3 through connector 204 pins 11 and 1, respectively. When the states of signals on pins 2 and 3 match conditions stored in the internal program, microcontroller 240 enables its pin 6 with a signal that causes attached indicator light 213 to flash. In this mode, microcontroller 40 continuously monitors the states of pins 7, (pushbutton 8, SW4), and 9 (pushbutton 10, SW2). This is the end of Step 1, described previously.

Step 2, also described previously, begins when the operator depresses "RECORD" pushbutton 210 (Ref FIG. 13). Microcontroller 240 detects the pushbutton depression by monitoring its own pin 9. When Pushbutton 210 is depressed, pin 9 of microcontroller 240 is grounded directly through switch SW2. Microcontroller 40 program logic recognizes the grounding of pin 9 as the code for "Pushbutton 10 depressed". Microcontroller 240, in response, accepts data from computer 249 (via pins 2–9 of connector 204) on its own pins 12–19 and stores this data in internal memory. Microcontroller 240 then turns off indicator light 213 signaling the end of message download Step 2.

Again referring to FIG. 14, quartz crystal X1 acts as a microcontroller clock support device and components C6 and C8 perform signal conditioning functions.

Step 3 and Step 4 are cable connect/disconnect functions.

Step 5 of the above described process is initiated by depression of "PLAY" pushbutton 208 and results in delivery of one or more messages from the present invention to computer printer 248. (Refer to the description of the similar process, previously described above, when pushbutton 8 of FIG. 3 is depressed.) Also, as described previously, pushbutton 208 can be replaced by an array of pushbuttons, providing a selection of messages to be delivered.

Figure 15:
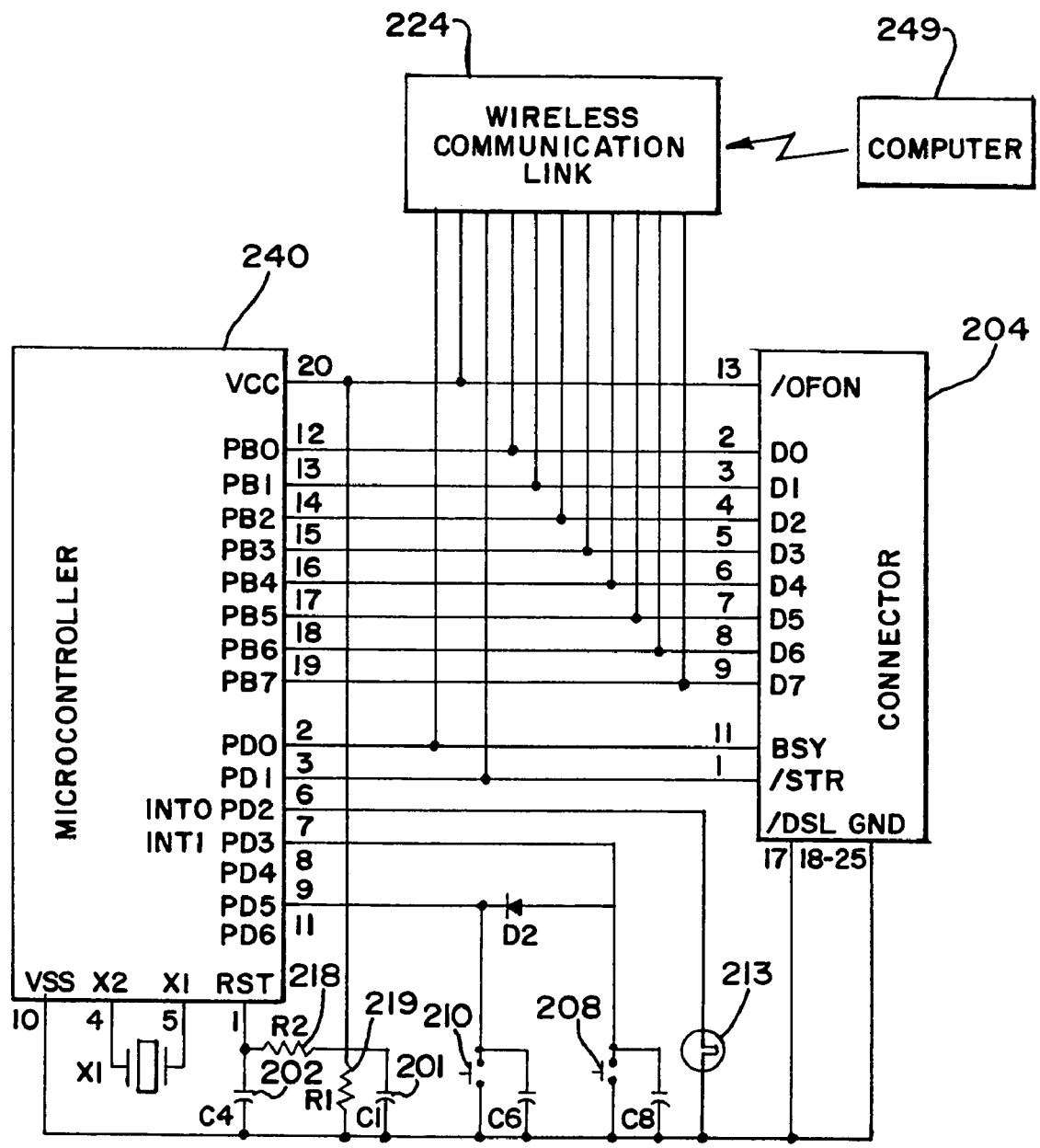
FIG. 15 is a schematic drawing of an alternate embodiment of the present invention.

FIG. 15 depicts an alternative embodiment of the present invention. Step 1 and Step 2 downloading and storage of message data is accomplished by use of a Wireless Communication Link 224 (WCL) as the connecting link to computer 249. Such a WCL is comprised of a bidirectional radio frequency transceiver or an infra red optical transceiver or the like. Depressing RECORD pushbutton 210 initiates communication with a correspondent transceiver mounted in computer 249 and results in message data downloaded to the present invention via the same wireless communication link.

Figure 16:
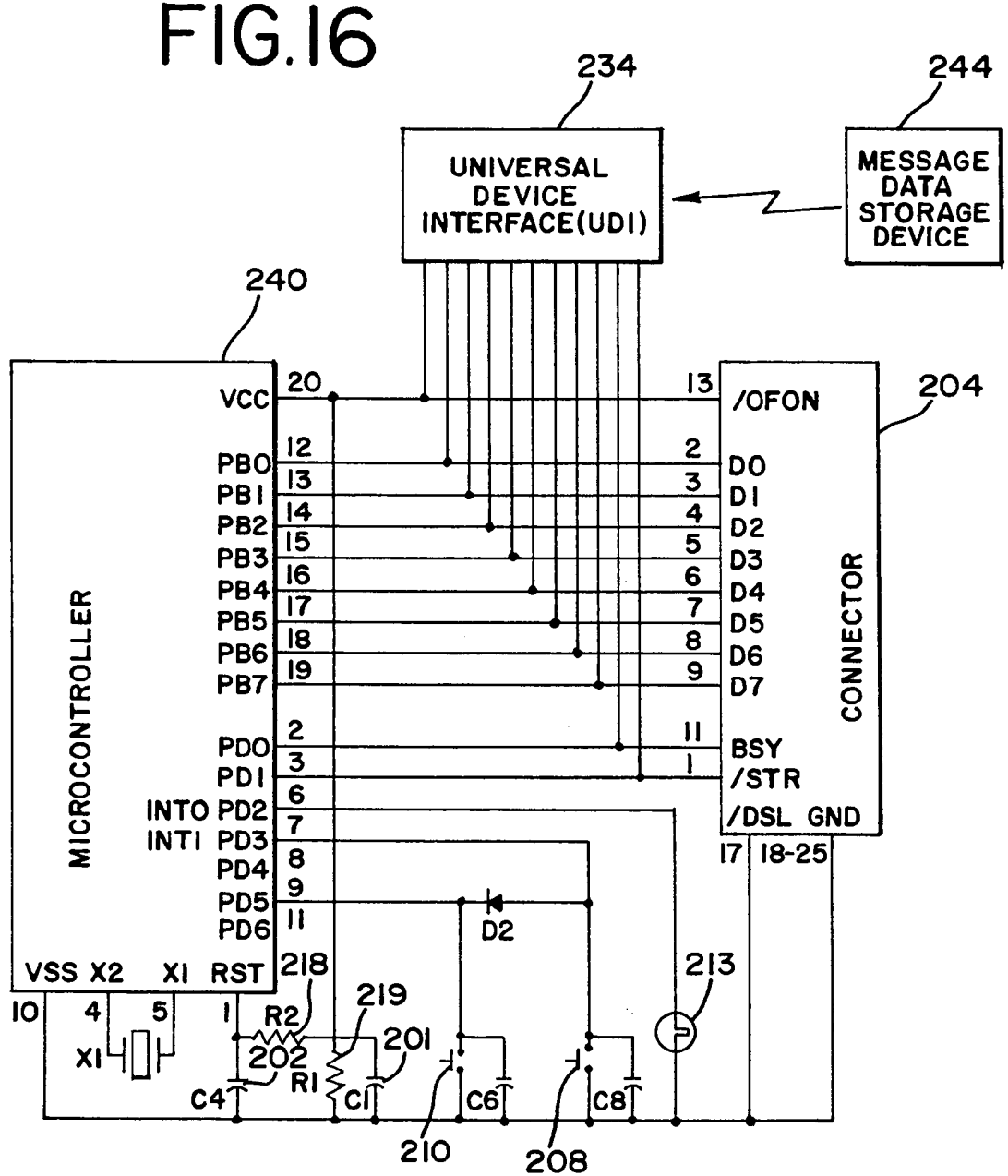
FIG. 16 is a schematic drawing of an alternate embodiment of the present invention.

FIG. 16 depicts an alternative embodiment of the present invention. Step 2 downloading is accomplished by use of a Universal Device Interface 234 (UDI). The UDI is an interface between the present invention and a Message Data Storage Device 244 (MDSD) which contains the desired message data. The MDSD may be a floppy disk, a removable semiconductor memory cartridge, a high density disk, a portable computer, a Personal Digital Assistant (PDA) or the like. The UDI, which may be a floppy disk drive, a semiconductor cartridge reader, a ZIP drive or a connection to a PDA or the like, converts the MDSD data into a data stream which microcontroller 240 can store in its internal memory.

Figure 17:
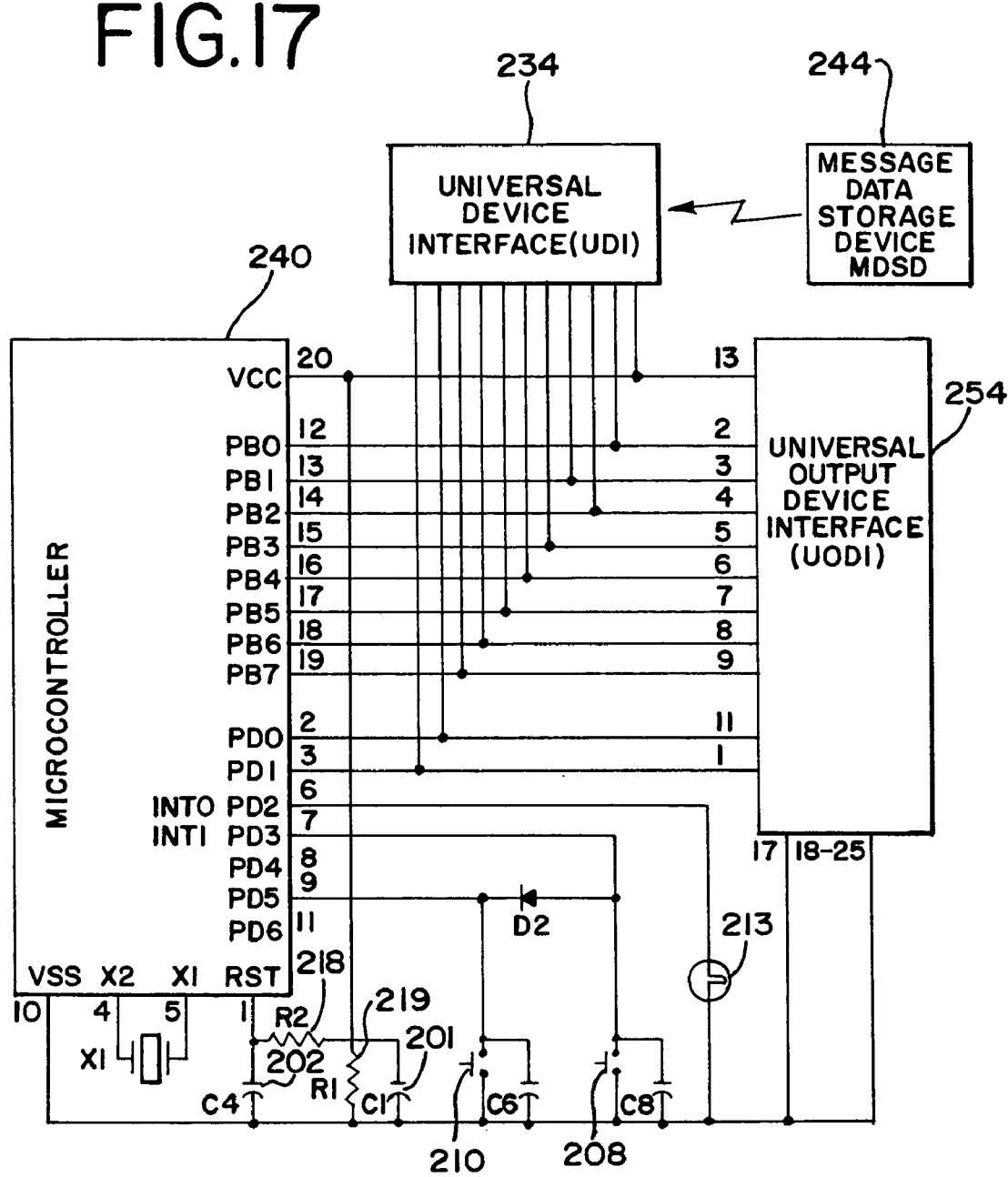
FIG. 17 is a schematic drawing of an alternate embodiment of the present invention.

FIG. 17 depicts an alternative embodiment of the present invention. Step 5 message delivery is accomplished by use of a Universal Output Device Interface 254 (UODI). The UODI is an interface between the present invention and a device to which the message is to be delivered. Such types of devices include printers, serial or parallel communications channels, USB ports, drivers for CRT or flat panel displays, PDAs and the like. Synchronization and timing of message delivery is controlled by microcontroller 240.

While various specific arrangements have been described herein and illustrated in the accompanying drawings, it will be clear to the reader possessed of relevant skills that such specific arrangements are exemplary only and that various modifications and alterations could be made without departure from the general ambit of the invention which is to provide a handheld device, capable of collecting and storing sufficient energy to power itself (and therefore requiring no battery or external power to operate), that will send stored messages to an attached computer printer, and such a device that neither the nature or content of the message nor the printing method of the attached computer printer are intrinsic or relevant to its design or operation. Also, although the present invention is self powered, it is clear to the reader possessed of relevant skills that the present invention could be operated on batteries or from an external power source without departure from the embodiments depicted herein.

The invention claimed is:

1. A tester for testing a computer printer, comprising:
a housing, said housing being sized to be hand-held, and having a microcontroller, a memory, a connector and a pushbutton array in communication with said microcontroller;
said housing being configured to be connected to a computer printer through said connector;
a computer program resident in said memory, wherein when said tester is connected to said computer printer, said tester is energized by said computer printer without need for additional energy source, such that when a button on said pushbutton array is depressed, said computer program will control the microcontroller which selects a message from memory to be transmitted to said computer printer to be printed.

2. The tester of claim 1, wherein said message contains a test image.

3. The tester of claim 1, wherein said housing is configured to be connected to a computer through said connector and said tester is energized by said computer without need for additional energy source, and wherein said computer program further comprises instructions that control said microcontroller, when another button on said pushbutton array is depressed, to receive the message from the computer and store the message in the memory.

4. The tester of claim 1, further comprising:
a wireless communication link, in communication with said microcontroller, wherein said computer program further comprises instructions that control said microcontroller, when another button on said pushbutton array is depressed, to communicate with a computer through the wireless communication link, receive the message from the computer and store the message in the memory.

5. The tester of claim 1, further comprising:
a universal device interface, in communication with said microcontroller, wherein said computer program further comprises instructions that control said microcontroller, when another button on said pushbutton any is depressed, to communicate with a computer through the wireless communication link, receive the message from the computer and store the message in the memory.

6. The tester of claim 5, further comprising:
a universal output device interface, in communication with said microcontroller, wherein said computer program further comprises instructions that control said microcontroller, when yet another button on said pushbutton array is depressed, to communicate with a device other than the computer printer through the universal output device interface to provide the message to the device.

7. The tester of claim 1, further comprising:
an energy conversion and storage device, coupled to the microcontroller and the connector, configured to receive a signal from the computer printer and convert the signal to derived power for use by the microcontroller.

8. A method for testing a computer printer using a portable tester, the method comprising:
receiving a signal from the computer printer;
converting the signal from the computer printer to derived power for use by the portable tester;
determining that a first button on the portable tester has been depressed; and
in response to the determination that the first button has been depressed, transmitting a message to the computer printer to be printed.

9. The method of claim 8, wherein transmitting the message further comprises selecting as the message a message of a plurality of messages corresponding to the first button based on the determination that the first button has been depressed.

10. The method of claim 8, further comprising:
determining that a second button of the portable tester has been depressed;
in response to the determination that the second button has been depressed, receiving the message from a computer coupled to the portable tester; and
storing the message in memory.

11. The method of claim 8, further comprising:
in response to the determination that the first button has been depressed, transmitting the message to a device other than the computer printer.

12. A tester for testing a computer printer, comprising:
means for receiving a signal from the computer printer;
means, coupled to the means for receiving, for converting the signal from the computer printer to derived power for use by the portable tester;

means for determining that a first button on the portable tester has been depressed; and means, in communication with the means for determining that the first button has been depressed, for transmitting a message to the computer printer to be printed in response to the determination that the first button has been depressed.

13. The tester of claim 12, further comprising:

means for storing a plurality of messages including the message.

14. The tester of claim 13, further comprising:

means, coupled to the means for determining that the first button has been depressed, to the means for transmitting and to the means for storing, for selecting as the message, based on the determination that the first button has been depressed, a message of the plurality of messages corresponding to the first button.

15. The tester of claim 12, further comprising:

means for determining that a second button of the portable tester has been depressed;

means, coupled to the means for determining that the second button has been depressed, for receiving the message from a computer coupled to the portable tester; and means, coupled to the means for receiving the message from the computer, for storing the message.

16. The tester of claim 12, further comprising:

means, in communication with the means for determining that the first button has been depressed, for transmitting the message to a device other than the computer printer.

* * * * *